(12) United States Patent
Venturino et al.

(10) Patent No.: US 7,106,375 B2
(45) Date of Patent: Sep. 12, 2006

(54) MUTUAL DISPLAY SUPPORT FOR A DIGITAL INFORMATION/IMAGING SYSTEM

(75) Inventors: Michael Venturino, Geneseo, NY (US); James E. McGarvey, Hamlin, NY (US); Steven G. Welk, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 776 days.

(21) Appl. No.: 10/242,338

(22) Filed: Sep. 12, 2002

(65) Prior Publication Data

US 2004/0051804 A1    Mar. 18, 2004

(51) Int. Cl.
*H04N 5/222* (2006.01)
(52) U.S. Cl. ................................. 348/333.02
(58) Field of Classification Search ........... 348/333.02, 348/333.04
See application file for complete search history.

(56) References Cited

U.S. PATENT DOCUMENTS

| | | | |
|---|---|---|---|
| 5,164,831 A | 11/1992 | Kuchta et al. | |
| 5,610,654 A | 3/1997 | Parulski et al. | |
| 6,118,480 A | 9/2000 | Anderson et al. | |
| 6,310,648 B1 * | 10/2001 | Miller et al. | 348/333.05 |
| 6,313,877 B1 | 11/2001 | Anderson | |
| 6,539,177 B1 * | 3/2003 | Parulski | 396/287 |
| 6,628,333 B1 * | 9/2003 | Gowda et al. | 348/333.11 |
| 6,829,009 B1 * | 12/2004 | Sugimoto | 348/333.02 |
| 2001/0015760 A1 | 8/2001 | Fellegara et al. | |
| 2001/0026263 A1 * | 10/2001 | Kanamori et al. | 345/156 |
| 2002/0024604 A1 | 2/2002 | Ejima et al. | |
| 2002/0030754 A1 | 3/2002 | Sugimoto | |
| 2002/0057351 A1 | 5/2002 | Suzuki et al. | |
| 2002/0097323 A1 * | 7/2002 | Takeyoshi | 348/207 |
| 2002/0171747 A1 * | 11/2002 | Niikawa et al. | 348/333.01 |

* cited by examiner

*Primary Examiner*—Ngoc-Yen Vu
*Assistant Examiner*—Dillon Durnford-Geszvain
(74) *Attorney, Agent, or Firm*—Pamela R Crocker (57) ABSTRACT

A digital information/imaging system comprising: a first display for selectively displaying images and information; a second display for selectively displaying system information; and a control for controlling the first and second displays in one or more modes in which the content displayed by each of the displays mutually support each other; wherein the control includes a user interface including at least a first switch and a second navigation switch; wherein when the first switch is not activated the second switch is operable to select items displayed on the first display and the second display displays information in support of items selected on the first display; and wherein when the first switch is activated the second switch is operable to select items displayed on the second display and the first display displays information in support of items selected on the second display.

17 Claims, 8 Drawing Sheets

MUTUAL DISPLAY SUPPORT FOR A DIGITAL INFORMATION/IMAGING SYSTEM

FIELD OF THE INVENTION

This invention relates in general to a digital information/imaging system, such as a digital camera, and more particular to a digital information/imaging system having multiple displays for images and systems information and a user interface that accomplishes interactive support between the multiple displays.

BACKGROUND OF THE INVENTION

Handheld digital information/imaging systems, such as digital cameras, cell phones, personal digital assistants, etc. have become widespread in use in recent years. In order to present images and systems information to a system user, the system is usually provided with at least one display for displaying images and/or information useful to the user. User interface switches are also usually provided to navigate among items displayed on the display. In digital cameras, it is typical to have a large LCD (Liquid Crystal Display) display for displaying an image or images captured by the digital camera. The display can also display image capture related functions and menus of camera features that are user selectable (See: U.S. Patent Application Publication U.S. 2002/0030754 A1, published Mar. 14, 2002, inventor Sugimoto; U.S. Patent Application Publication US 2002/0024604 A1, published Feb. 28, 2002, inventors Fjima et al.; U.S. Patent Application Publication U.S. 2002/0057351 A1, published May 16, 2002, inventors Suzuki et al.; U.S. Pat. No. 6,313,877 B1, issued Nov. 6, 2001, inventor Anderson). Because a large LCD display used for images consumes much battery power, digital cameras can be provided with a smaller LCD display that uses less power. Such a display typically displays various camera status data to the camera user. The displayed data is spatially fixed and the LCD display is not capable of presenting programmed information in such as text support of the content in the main LCD display. (See: U.S. Patent Application Publication U.S. 2001/0015760 A1, published Aug. 23, 2001, inventors Fellegara et al.). U.S. Pat. No. 6,118,480, issued Sep. 12, 2002, inventors Anderson et al., is of interest in disclosing a digital camera having a large image LCD display and a smaller status LCD. A single 4-way switch can be used to navigate between items displayed on either LCD. However, the status LCD has spatially fixed status icons and cannot be programmed to display other information in support of the image LCD content.

SUMMARY OF THE INVENTION

According to the present invention, there is provided a solution to the problems and fulfillment of the needs set forth above.

According to a feature of the present invention, there is provided a digital information/imaging system comprising: a first display for selectively displaying images and information; a second display for selectively displaying system information; and a control for controlling said first and second displays in one or more modes in which the content displayed by each of said displays mutually support each other; wherein said control includes a user interface including at least a first switch and a second navigation switch; wherein when said first switch is not activated said second switch is operable to select items displayed on said first display and said second display displays information in support of items selected on said first display; and wherein when said first switch is activated said second switch is operable to select items displayed on said second display and said first display displays information in support of items selected on said second display.

ADVANTAGEOUS EFFECT OF THE INVENTION

The invention has the following advantages.
1. A digital information/imaging system is provided having first and second displays which are mutually supportive of each other's content.
2. The nature of this mutual display support is such that supporting display can portray on-camera help, procedural instructions, and on-camera tool tips.

DETAILED DESCRIPTION OF THE INVENTION

Although in the following description, the present invention will be described incorporated into a digital camera, it will be understood that the invention is also applicable to other hand held or portable digital information/imaging systems such as cell phones, personal digital assistants, portable computers and the like.

Figure 1:
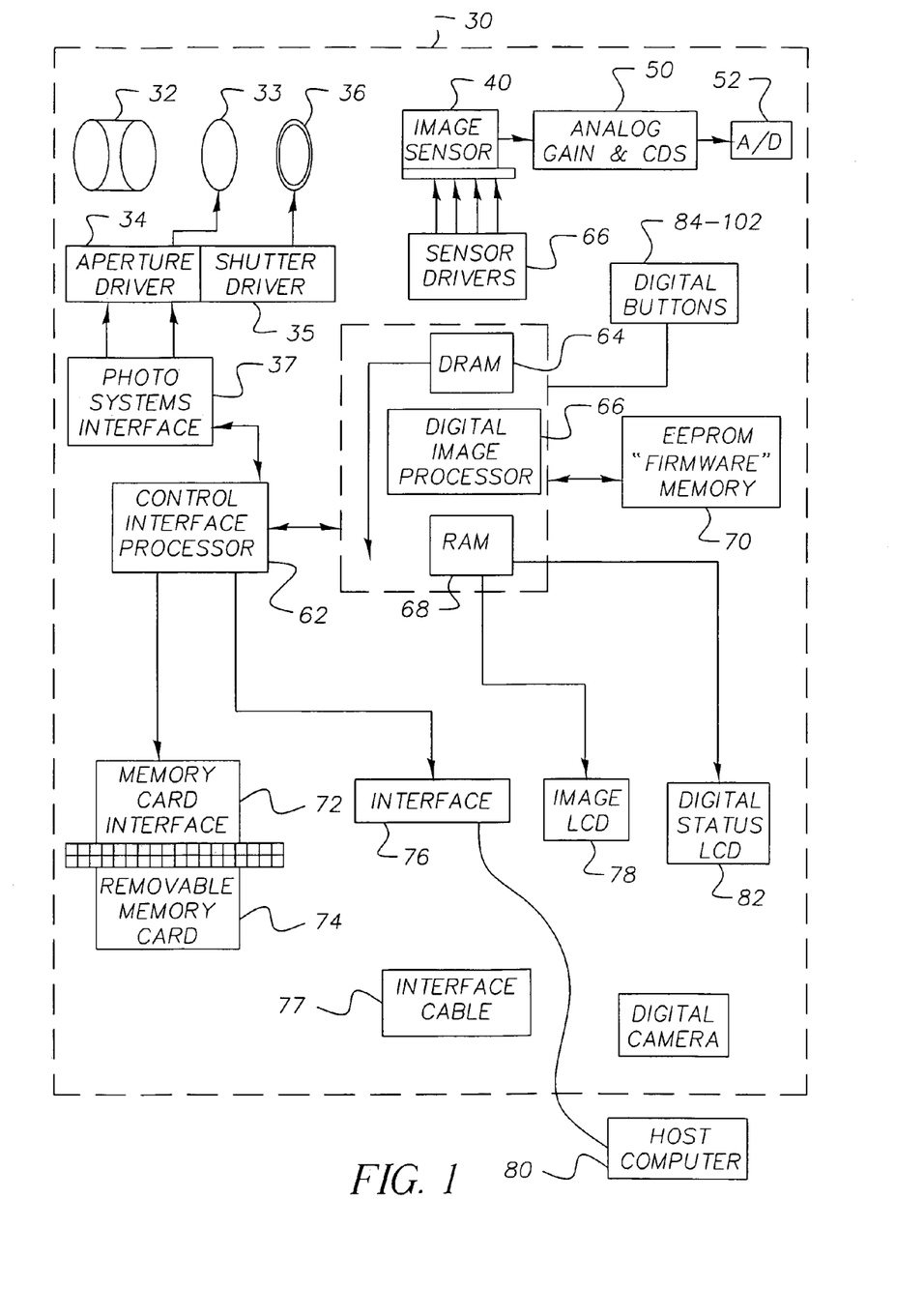
FIG. 1 is a block diagram of an exemplary digital camera incorporating the present invention.

FIG. 1 is a block diagram of an exemplary digital camera which implements the method and incorporates the apparatus of the present invention. The digital camera 30 produces digital images that are stored on the removable memory card 74. The digital camera 30 includes a lens 32, an electrically adjustable aperture 33 driven by aperture motor drive 34 and an electrically driven mechanical shutter 36 driven by shutter motor drive 35. The lens 32 focuses light from a scene (not shown) on an image sensor 40, for example, a single-chip color CCD image sensor, using the well known Bayer color filter pattern. The image sensor 40 is controlled by sensor driver 42. The aperture motor 34 and shutter motor 35 and the sensor driver 42 are controlled by control signals supplied by a control interface processor 62 and photo systems interface 37.

The control interface processor 62 receives inputs from the Photo Systems Interface 37. The analog output signal from the image sensor 40 is amplified and converted to digital data by the analog signal processor (ASP) 50 and analog-to-digital (A/D) converter circuit 52. The ASP 50 and A/D 52 includes a programmable electrical gain that can be used to adjust the effective ISO speed setting of the camera. This can be done as described in commonly-assigned U.S. Pat. No. 5,610,654, issued Mar. 11, 1997, inventors Parulski et al. The digital data is stored in a DRAM buffer memory 64 and subsequently processed by a digital image processor 66 controlled by the firmware stored in the firmware memory 70, which can be flash EPROM memory. Alternatively, the digital image processor 66 can be provided by custom circuitry (e.g., by one or more custom integrated circuits [ICs] designed only for use in digital cameras), or by a combination of programmable processor(s) and custom circuits.

The processed digital image file is provided to a memory card interface 72 which stores the digital image file on the removable memory card 74. Removable memory cards 74 are known to those skilled in the art. For example, the removable memory card 74 can include memory cards adapted to the PCMCIA card interface standard, as described in the PC Card Standard, Release 2.0, published by the Personal Computer Memory Card International Association (PCMCIA), Sunnyvale, Calif., September 1991, or to the *CompactFlash Specification Version* 1.3, published by the CompactFlash Association, Palo Alto, Calif., Aug. 5, 1998. Other types of removable memory cards, including Smart Memory cards, Secure Digital (SD) cards, and Memory Stick cards, or other types of digital memory devices, such as magnetic hard drives, magnetic tape, or optical disks, could alternatively be used to store the digital images.

In some embodiments, the digital image processor 66 performs color interpolation followed by color and tone correction, in order to produce rendered sRGB image data. The rendered sRGB image data is then JPEG compressed and stored as a JPEG image file on the removable memory card 74. In other embodiments, the processor directly compressed data on the removable memory card 74, and the image is later "finished" by processing the compressed Bayer color image data using the host PC 80.

The processor 66 also creates a "thumbnail" size image that is stored in RAM memory 68 and supplied to the color image LCD 78, which displays the captured image for the user to review. A digital status dot matrix LCD 82 is also provided. The mutual display support between LCDs 78 and 82 is described in more detail later. Instead of a color LCD image display, the digital camera 30 could use an organic light emitting diode (OLED) display, or many other types of image displays. The thumbnail image can be created as described in commonly-assigned U.S. Pat. No. 5,164,831, issued Nov. 17, 1992, inventors Kuchta et al., the disclosure of which is herein incorporated by reference. The graphical user interface displayed on the color LCD image display 78 and on the digital status LCD 82 is controlled by the user interface portion of the firmware stored in the firmware memory 70 and by digital buttons 84–102. A third display (not shown) can be provided on the top of the camera 10 to show camera body settings such as aperture, shutter speed, exposure mode, etc.

After a series of images have been taken and stored on the removable memory card 74, the removable memory card 74 can be inserted into a card reader (not shown) in host PC 80. Alternatively, an interface cable 77 can be used to connect between the interface 76 in the digital camera 30 and the host PC 80. The interface cable 77 can conform to, for example, the well known IEEE 1394 interface specification, the universal serial bus (USB) interface specification, or other wired or wireless interface specifications.

Alternatively, the digital camera 30 could be comprised of a digital back for a 35 mm or medium format film camera. In this case, the lens 32, aperture 34, shutter 36 are provided as part of the film camera body, and the other components, including the image sensor 40, image processor 66 and color LCD image display 78, are provided as part of a separate digital camera back that is connected to the film camera body. The connection preferably includes an electrical connector (not shown), so that the lens 32, aperture 33, and shutter 36 can be controlled by the control processor and timing generator 60 in the digital back.

Figure 2:
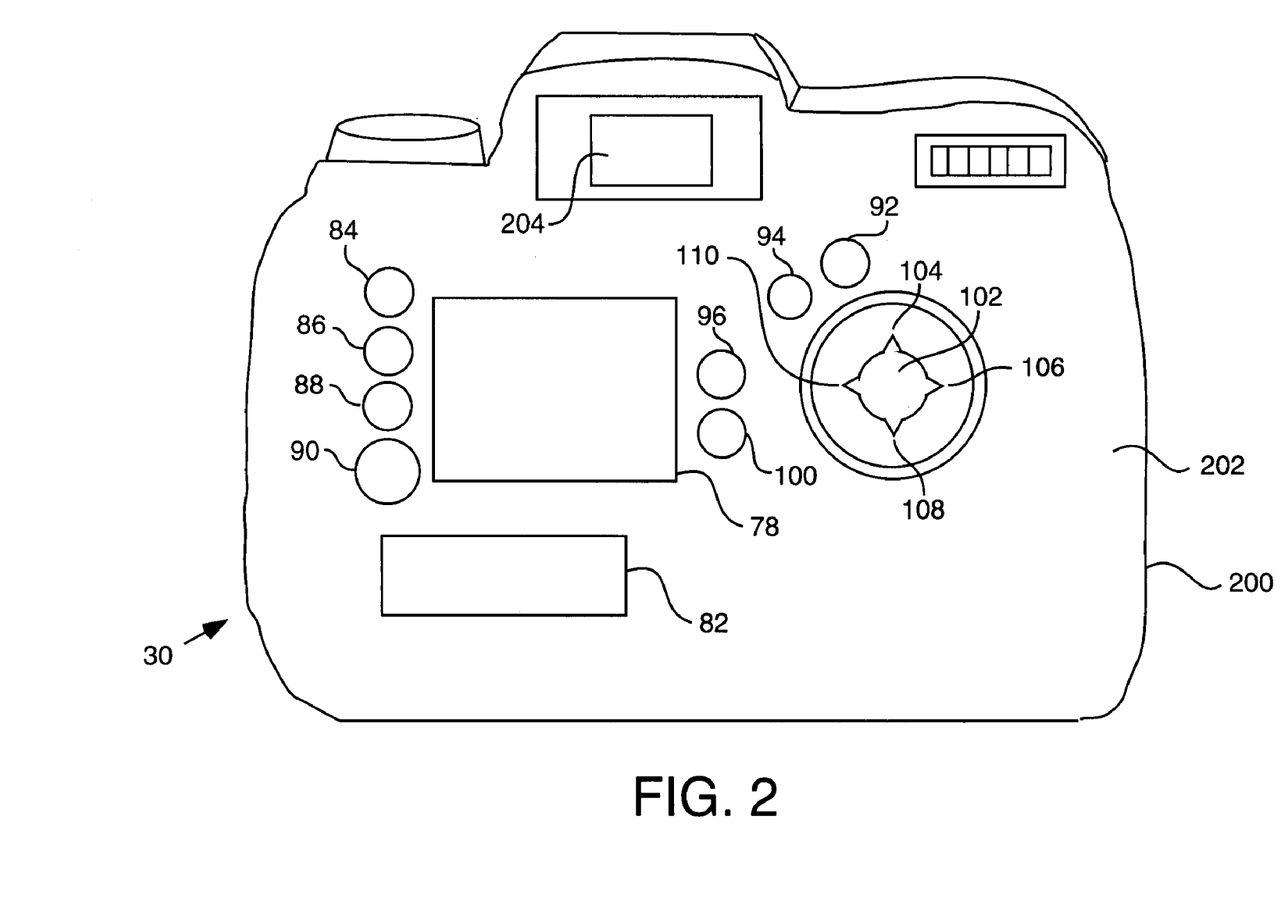
FIG. 2 is a diagrammatic view of the back panel of the camera of FIG. 1 showing first and second displays and a user interface according to the invention.

Referring now to FIG. 2 there is shown a diagrammatic view of a camera 30 showing the back panel of the camera with components of a digital user interface incorporating the present invention. As shown, digital camera 30 includes a housing 200 having a back panel 202 including image LCD 78, digital status LCD 82 and digital buttons 84–102. Back panel 202 also includes a viewfinder 204 and other camera controls (not described). Digital buttons 84–102 include menu button 84, navigate button 86, hotkey button 88, digital status button 90, OK button 92, cancel button 94, delete button 96, tag/record button 100 and 4-way switch 102 having top (12 o'clock) position 104, right side (3 o'clock) position 106, bottom (6 o'clock) position 108, and left side (9 o'clock) position 110.

According to the present invention, the mutual display support involves an interrelationship between information portrayed on the digital camera's Image LCD 78 and Digital Status LCD 82. For example, when one display portrays a menu/icons with selectable options, the other display portrays information that supports the first display. The supporting information can take any of three forms, including:
  interpretive information that identifies, describes, or disambiguates a highlighted menu option;
  procedural instructions for accomplishing some imaging task, or other task;
  display of options within the context of a menu.

The information presented on the two displays 78 and 82 is intended to be contextually-sensitive, allowing the displays 78 and 82 to work together in a flexible but mutually exclusive manner. When one of the displays assumes an "interactive" display role, the other display 78 or 82 assumes a "supporting" display role. An interactive display role is defined in terms of a control-display relationship in which manipulation of digital camera buttons results in a change in some value in the digital camera firmware 70 whose resulting change is displayed on the display 78 or 82. A supporting display role is defined as an information-only display in which the displayed information is dependent upon the displayed outcome of the control-display relationship associated with the interactive display 78 or 82.

Image LCD-78

A color Image LCD 78 serves as the display for interfacing with the camera menu system containing features and functions (e.g., image review, setting/changing settings). The Image LCD 78 displays three classes of information
  images and image-related information (e.g., histogram);
  camera digital feature/function menus, related sub-menus, and menu options;
  text-based messages and error messages.

Digital Status LCD-82

The Digital Status LCD 82 is a programmable dot matrix display. The Digital Status LCD 82 portrays three classes of information, including:
  the current status and settings that pertain to various capture-critical digital functions (icons and alphanumeric characters);
  the information properties of images being reviewed on the Image LCD;
  text-based messages to support and help interpret information displayed on the Image LCD;
  procedural instructions.

With respect to its role in image capture, the Status LCD 82 assumes an enhanced interaction capability that will allow efficient access to these capture-related digital functions (white balance, etc).

The following describes the behavior of the digital buttons 84–102:

4-Way Switch

The 4-way switch 102 is composed of a single 4-directional rocker switch located on the back panel 202 of the camera 30. When pressed at one of the 12, 3, 6, or 9 o'clock positions 104, 106, 108, 110, the switch will result in an appropriate signal to the digital camera 30 and its associated firmware 70. The 4-way switch 102 controls different aspects of the camera depending on the state of the Image LCD 78.

4-way Switch: LCD 78

When the Image LCD 78 is on, the 4-way switch 102 is captured by the digital firmware and is used to control the information displayed on the Image LCD 78. The 4-way switch 102 operates in the following manner:

When any Display Mode is active (except when the Region of Interest (ROI) box is enabled):
  pressing the right 106/left 110 side of the 4-way switch 102 results in forward/backward navigation of images;
  pressing the top 104/bottom 108 of the 4-way switch 102 sequences through the four Display Modes.

When the Zoom Mode is active and the ROI box is enabled:
  pressing the left 110/right 106 side of the 4-way switch 102 results in a left 110/right 106 movement of the ROI box;
  pressing the top 104/bottom 108 of the 4-way switch results in a upward/downward movement of the ROI box.

When any Tabbed Menu screen or text-based menus are displayed on the LCD 78:
  pressing the right 106/left 110 side of the 4-way switch 102 results in left/right navigation of menu options (e.g., Tabbed Menu screens);
  when a Tabbed screen option with a cascaded menu is highlighted, pressing the right 106 side of the 4-way switch 102 enables the cascaded menu with the current value highlighted;
  when an enabled cascaded menu or double-cascaded menu is displayed, pressing the left side 110 of the 4-way switch 102 disables the menu;
  pressing the top 104/bottom 108 of the 4-way switch 102 results in an upward/downward navigation through vertically-arranged menu options (e.g., Tabbed Menu screen options, cascaded menu options).

The 4-way switch 102 may be used in a discrete or continuous manner. That is, images or menu options may be navigated one at a time by pressing and releasing one side of the 4-way switch 102. Alternatively, images or menu options may be navigated continuously by pressing and holding (for longer than 500 milliseconds) one side of the 4-way switch 102.

4-way Switch 102: Digital Status Button 90 Active

When the Digital Status button 90 is pressed and held, the 4-way switch 102 is captured, taking control from either of the other camera functions (i.e., autofocus, Image Display) currently using the 4-way switch 102. When under the control of the Digital Status button 90, the 4-way switch 102 is used to sequence among the functions displayed on the Digital Status Display 82.

When the Digital Status button 90 has control of the 4-way switch 102, the switch 102 operates in the following manner:

manipulation of the right 106-left 110 sides of the 4-way switch 102 sequences among the functional groupings, with wraparound;

manipulation of the top 104-bottom 108 sides of the 4-way switch 102 sequences among the functional groupings, with wraparound.

OK Button-92

The OK button 92 is a push button located on the right side of the camera's back panel 202, just to the left of the 4-way switch 102 and above the Cancel button 94. The OK button 92 serves a number of functions:
  when the image LCD 78 is off, pressing the OK button turns it on;
  when a menu option is highlighted on image LCD 78, pressing the OK button 92 will implement that option;
  in the Zoom Mode with the ROI box disabled, pressing the OK button 92 will enable the ROI box at the default or the last-used position;
  in the Zoom Mode with the ROI box enabled, pressing the OK button will implement the zoom;
  when any confirmation screen is presented on image LCD 78, pressing the OK button 92 will implement the process (i.e., Delete Image, Click Balance).

Cancel Button-94

The Cancel button 94 is a push button located on the upper right side of the camera's back panel 202, just to the left of the 4-way switch 102 and below the OK button 92. The Cancel button 94 will serve a number of functions:
  when the image LCD 78 is on and any Display Mode is active, pressing the Cancel button 94 will turn the image LCD 78 off;
  when the image LCD 78 is on and displaying a sub-menu, pressing the Cancel button 94 exits from that sub-menu to the parent menu in the user interface architecture without implementing any changes;
  in the Zoom mode with the ROI box enabled, pressing the Cancel button 94 will disable the ROI box;
  when any confirmation screen is presented, pressing the Cancel button 94 does not implement the process (Delete Image, Click Balance);
  when the Menu Bar is displayed on the image LCD 78, the Cancel button 94 will dismiss it. (The Menu Bar can also be toggled off by pressing the Menu button).

Menu Button-84

The Menu button 84 is a push button located on the left side of the camera's back panel 202, just to the left of the Image LCD 78 and above the Navigate button 86. The Menu button 84 will serve the following functions:
  when the Image LCD 78 is on and any Display Mode is active, pressing the Menu button 84 will display the last-accessed Tabbed Menu screen with the last-accessed option highlighted;
  when the tabbed Menu screen and its associated text-based menu is displayed on Image LCD 78, pressing the Menu button 84 will dismiss the Menu screen and display the last-used image mode;
  when the Image LCD 78 is off, pressing the Menu button 84 will turn the Image LCD 78 on and display the last-accessed Tabbed Menu screen with the last-accessed option highlighted;
  when a submenu option requiring an OK 92/Cancel button 94 press, the Menu Button 84 will not dismiss the Menu screen;
  when any Tabbed Menu screen is displayed on Image LCD 78, pressing and holding the Menu button 84 and manipulating the right 106/left 110 side of the 4-way switch 102 navigates the tabbed screens.

Nav+ Button-86

The Nav+ button 86 allows a method of quickly and efficiently navigating among folders and images within a folder. The Nav+ button 86 is located on the left side of the Image LCD 78, below the Menu button 84. The Nav+ button 86 works in conjunction with the 4-way switch 102 to accomplish the following functions:

navigating among folders on a card;

navigating several images at a time within a folder.

When pressed, the Nav+ button 86 accomplishes the following:

if the Image LCD 78 is off, it turns the Image LCD 78 on and displays the currently active Image Mode with the Nav+ overlay.

The Nav+ overlay includes the following information:

a list of folder names that exist on the memory card together with the number of images in each folder;

a location bar that indicates the position of the current image relative to the total number of images in the folder;

the location bar will have shading to indicate the number of images in the folder relative to the maximum number of images (maximum=99);

the location bar will have tick marks every nth image;

if the Image LCD 78 is on, it displays the currently active Image Mode with the Nav+ overlay;

displays review-related information on the Digital Status display LCD 82.

Hotkey Button-88

The Hotkey button 88 is a push button located on the left side of the camera's back panel, to the left of the Image Display and below the Nav+ button 86. The Hotkey button 88 is used in conjunction with the 4-way switch 102 to allow quick access to user-specified functions. The Hotkey button 88 serves as a shortcut to a (user defined) frequently-changed function so that the function's current value may be changed. One or more functions can be set for use with the hotkey button.

When pressed, the Hotkey button 88 accomplishes the following:

if the Image LCD 78 is off, it turns the Image LCD 78 on and displays the function associated with the first Hotkey position;

if the Image LCD 78 is on, it displays the function associated with the first Hotkey position;

when used in conjunction with the 4-way switch 102 it displays the user-selected function;

pressing the Hotkey button and manipulating the right side of the 4-way switch 102 sequences through the Tabbed Menu screens associated with the assigned Hotkey positions in an ascending numerical order; the Digital Status Display portrays the information associated with the highlighted menu option;

pressing the Hotkey button 88 and manipulating the left side of the 4-way switch 102 sequences through the assigned Hotkey positions in a descending numerical order; the Digital Status Display portrays the information associated with the highlighted menu option;

as each Hotkey position is selected, its associated tabbed menu screen with highlighted function is displayed with a disabled appearance. When the Hotkey button 88 is released, the Tabbed Menu screen becomes enabled;

only functions associated with assigned Hotkey positions are displayed (i.e., unassigned positions are ignored for display purposes).

Digital Status Button-90

The Digital Status button 90 is a push button located above the top left corner of the Digital Status display 82. This button functions to control access to capture-related functions portrayed on the Digital Status display 82.

pressing and holding the Digital Status button 90 highlights the last-used Digital Status display 82 function, traps the 4-way switch 102, and displays the tabbed Menu screen for the highlighted function (disabled appearance) on the Image Display 78;

if review-related information is displayed, pressing the Digital Status button 90 displays capture-related information and highlights the icon associated with the last-accessed function highlighted;

when the Digital Status button 90 is released, the Menu function is enabled.

Digital Status LCD-82

The Digital Status LCD 82 is a programmable display that portrays three different classes of information: (1) the current status and settings that pertain to various capture-critical digital functions, (2) the information properties of images being reviewed on the Image LCD 78, and (3) text-based messages to support and help interpret information displayed on the Image LCD 78. With respect to its role in image capture, the Digital Status LCD 82 assumes an enhanced interaction capability that will allow efficient access to these capture-related digital functions (white balance, etc.). With respect to its roles in menu screen navigation, the Digital Status LCD 82 assumes an interpretive support role (e.g., "help messages", and "tool tip messages") for the content on the Image Display 78.

Capture-related Information: Interactive Display-Control Elements

The capture functionality of the Digital Status display 82 will be interactive in nature and will serve two functions:

displays a set of icons associated with capture-critical functions; these icons portray the current value of each function.

serves as a shortcut to a relevant menu option for changing the displayed value of the highlighted function.

The nature of the interaction is such that when a display element is highlighted by the user, the highlighted function on the Digital Status Display calls and portrays its associated Tabbed Menu screen function on the Image Display 78. The user may then interact directly with the Menu options associated with that function.

Figure 3:
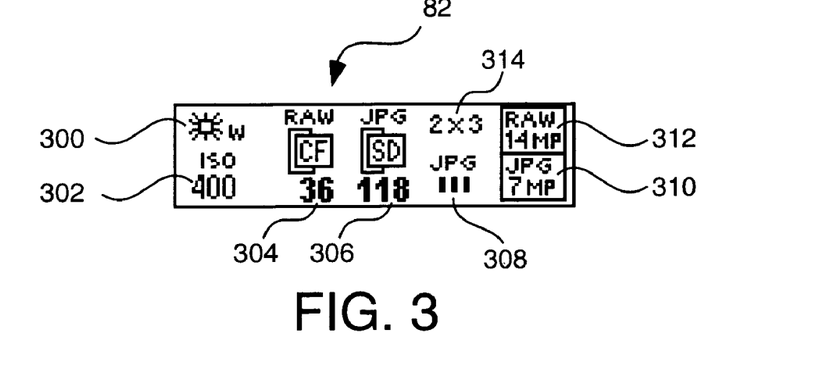
FIGS. 3–14 are diagrammatic views useful in explaining the present invention.

As shown in FIG. 3, Digital Status Display 82 displays icons for the following functions: white balance 300;

ISO speed 302;

CF and MM/SD memory cards 304, 306;

JPEG quality 308;

raw and JPEG resolution 310, 312; and crop aspect ratio 314.

Figure 4:
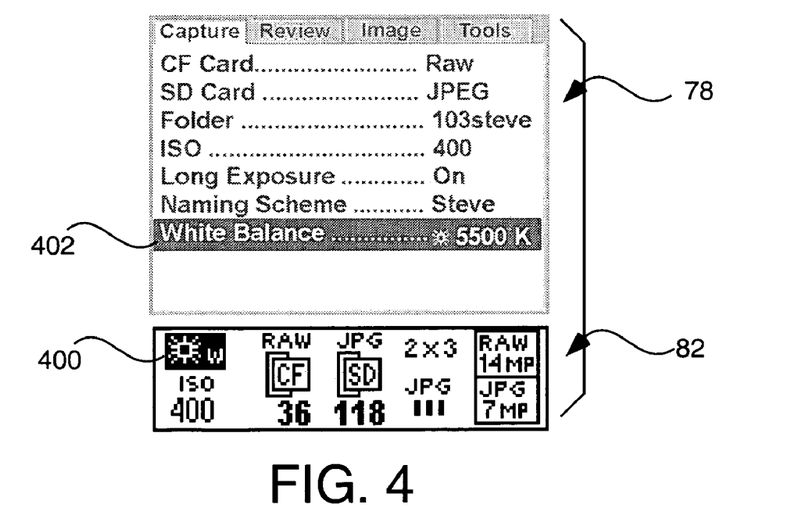

The highlighted Digital Status Display function 400 on display 82 has a corresponding menu option 402 displayed on Image Display 78 (FIG. 4).

Review Display Elements (Read Only)

The review functionality of the Digital Status Display will be non-interactive in nature and will serve a single purpose: it displays a set of image-based information that existed at the time of capture for the image.

Figure 5:
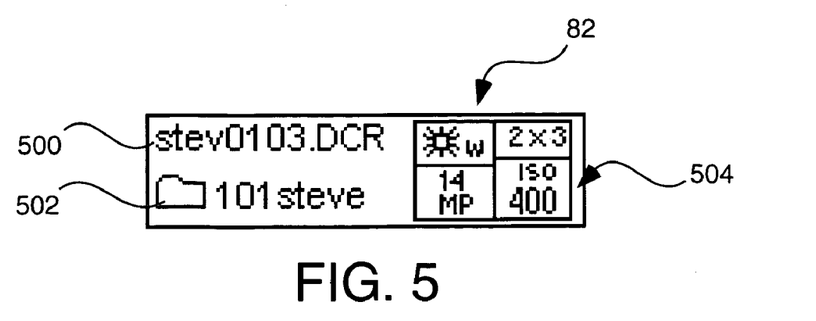

When the review-related information is displayed, the Digital Status Display reverts to the capture-related information when the shutter button is pressed to S1. In FIG. 5, current image number 500 and current folder name 502 are displayed on the left and white balance, crop aspect ratio, ISO and resolution 504 are displayed on the right of Digital Status Display 82.

Context-Sensitive Text Messages (Read Only)

The Digital Status Display 82 also provides a supporting role to the Image LCD 78. The nature of this support will be a combination of a "mini-help" and a "tool tips" function. The design intent behind this mutual display support is to provide an on-camera help system to aid the less experienced digital user.

The following example illustrates the mutual display support system of the present invention.

Figure 6:
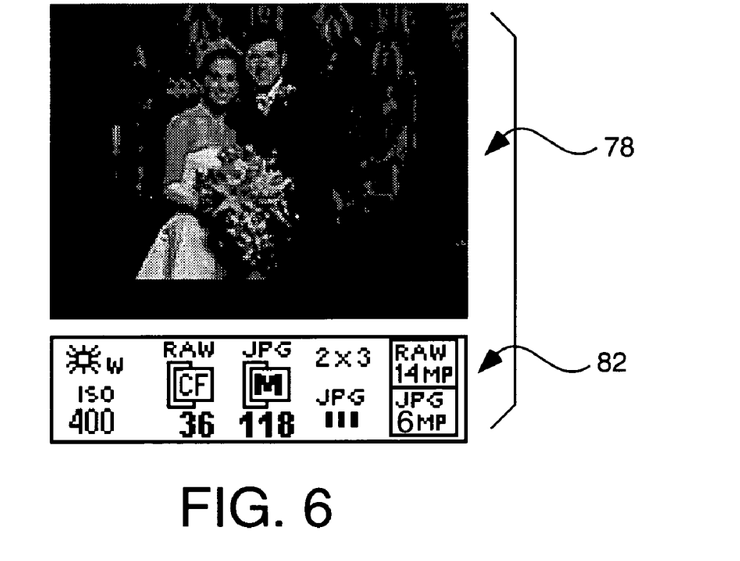

In the following interaction flow, the user's goal is to change the resolution of raw image files from 14 MP (megapixels) to 6 MP. (Note that in following steps 1 to 3 the Image LCD 78 assumes a supporting display role to the Digital Status display 82, which assumes an interactive display role. In following steps 4–6 the Image LCD 78 assumes an interactive display role while the Digital Status display 82 assumes a supporting display role). FIG. 6 shows an image displayed on image display 78 and image capture functions on status display 82.

Step 1

Figure 7:
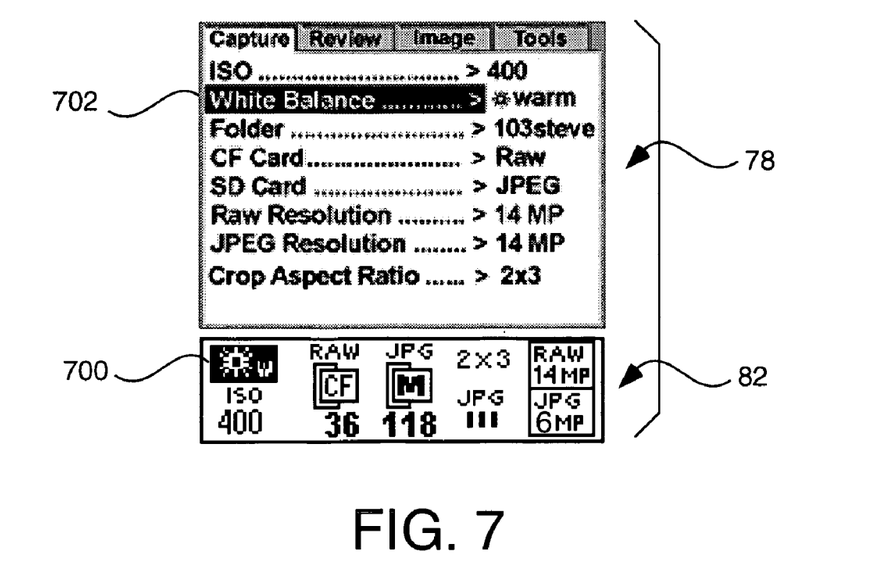

User Action: the user presses and holds the Digital Status button 90.

Consequent Camera Behavior (FIG. 7):

the icon associated with last-accessed Digital Status Display 82 function is highlighted (in this example, White Balance 700);

the camera menu screen (with highlighted option 702) associated with that function is displayed on the Image LCD using a disabled (faded) appearance. The disabled appearance indicates that image LCD 78 is display-only and not interactive.

Step 2

Figure 8:
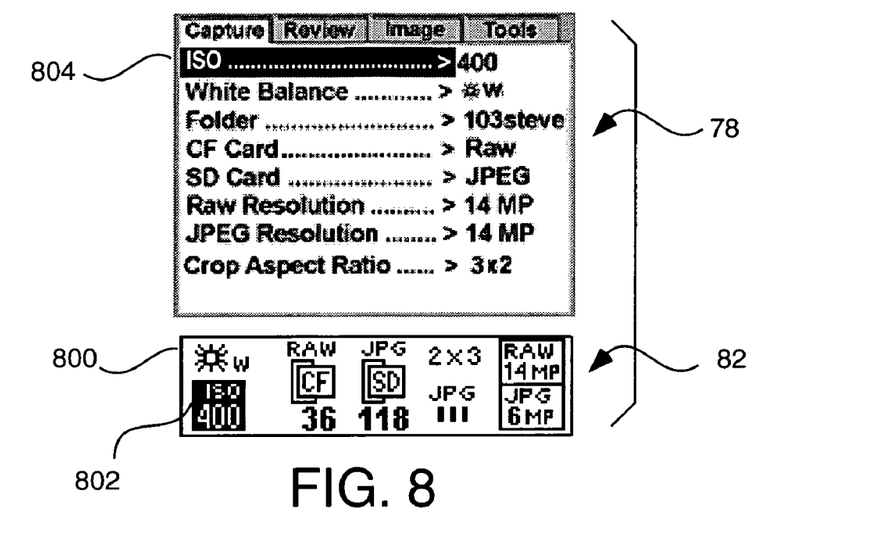

User Action: while continuing to press and hold the Digital Status button 90, the user presses the bottom side 108 of the camera's 4-way switch 102.

Consequent Camera Behavior (FIG. 8):

the Digital Status Display 82 highlighting changes to the icon below the highlighted function (in this example, ISO 802 is highlighted and White Balance 800 reverts to its normal display state);

the Image LCD 78 content is updated to display the camera menu screen (with highlighted option) associated with newly highlighted Digital Status Display function 804 (ISO).

Step 3

Figure 9:
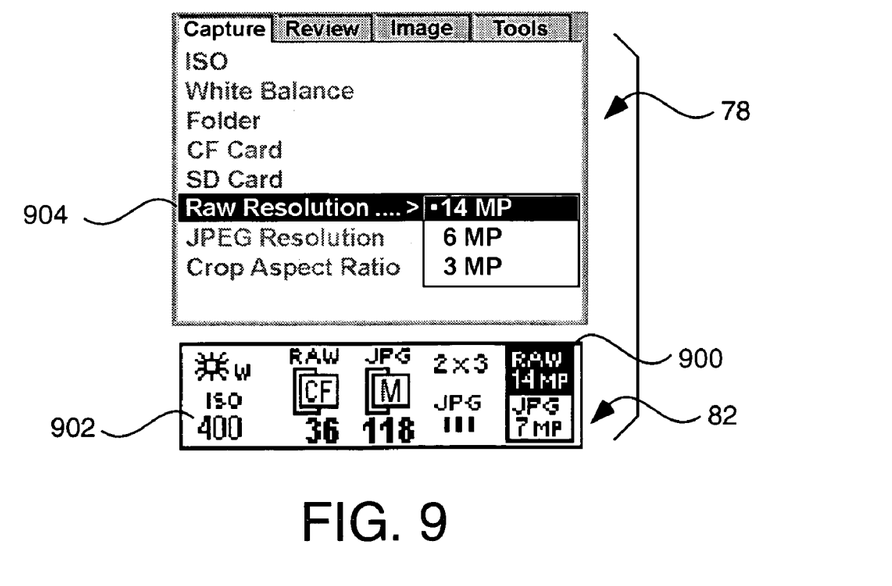

User Action: while continuing to press and hold the Digital Status button 90, the user presses the left side 110 of the camera's 4-way switch 102.

Consequent Camera Behavior (FIG. 9):

the Digital Status Display 82 highlighting changes to the raw resolution icon 900 on the far right side of the display 82 (in this example, the wrap-around behavior dictates that the highlighting moves from the leftmost to the rightmost icon; the raw resolution icon 900 is highlighted and ISO icon 902 reverts to its normal display state)the Image LCD 78 content is updated to display the camera menu screen (with highlighted option 904) associated with newly highlighted Digital Status Display 82 function 900. Image LCD 78 remains in a disabled appearance.

Step 4

Figure 10:
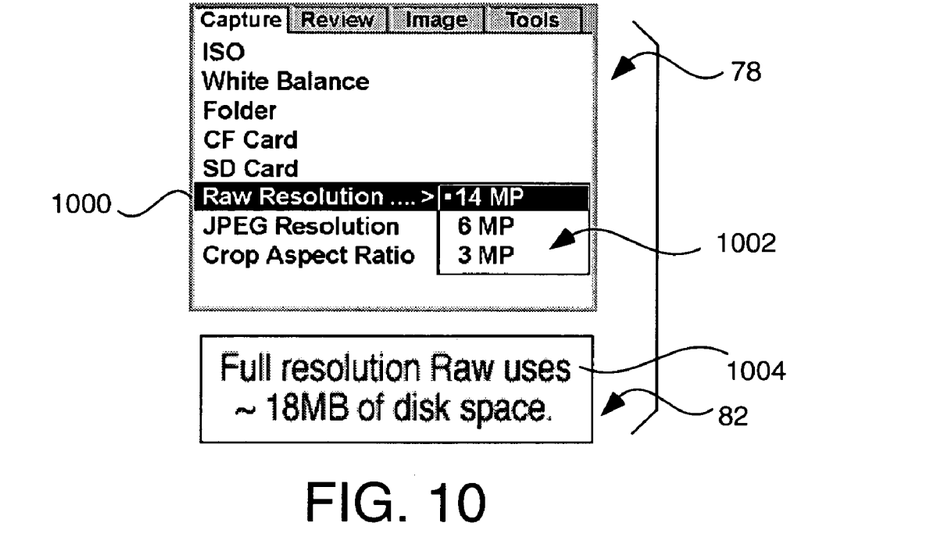

User Action: the user releases the Digital Status button 90.

Consequent Camera Behavior (FIG. 10):

the Image LCD 78 reverts to an interactive display role (the disabled appearance is removed), with the selected function 1000 highlighted and current value in the cascaded menu 1002 highlighted;

the Digital Status display 82 assumes a supporting display role, with a text message 1004 describing the highlighted option (in this case, information about raw file resolution).

Step 5

Figure 11:
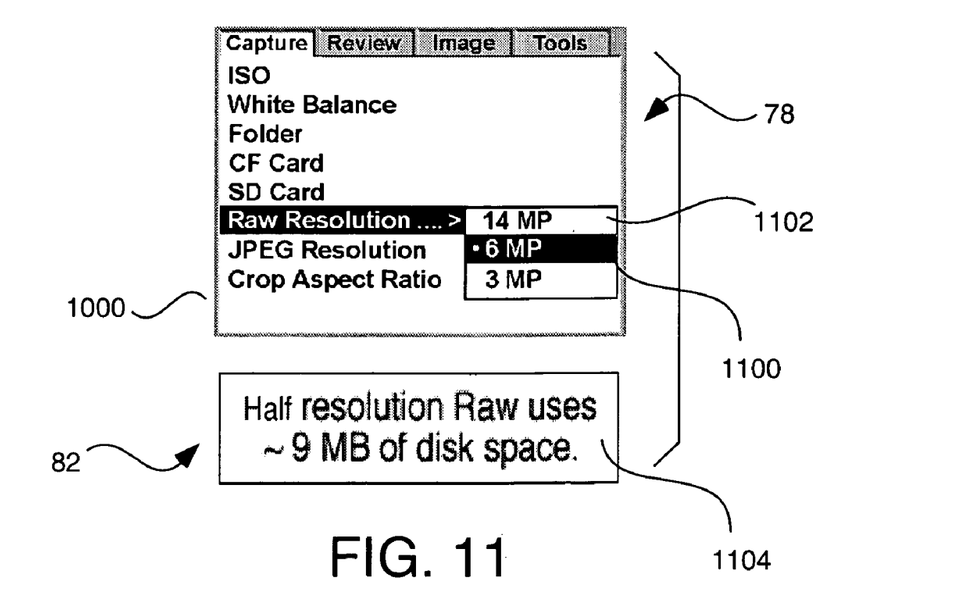

User Action: the user presses the bottom side 108 of the 4-way switch 102.

Consequent Camera Behavior (FIG. 11):

the option highlighting on the Image LCD 78 changes to the option 1100 below the previously highlighted position 1102;

the Digital Status display 82 portrays a text message 1104 describing the highlighted option 1100.

Step 6

User Action: the user presses the OK button 92

Figure 12:
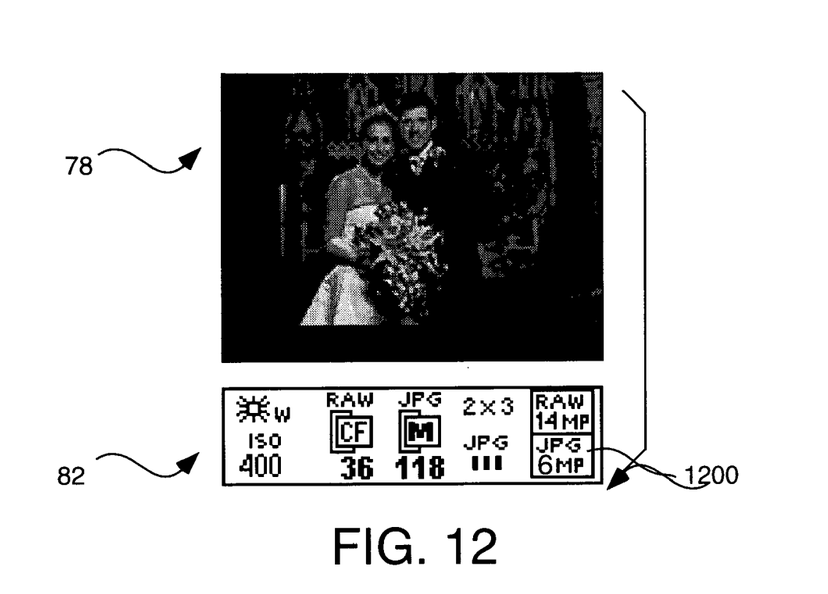

Consequent Camera Behavior (FIG. 12):

the Image LCD 78 reverts to the state existing before the Digital Status button 90 was activated (image is displayed);

the Digital Status display 82 portrays capture-related functions, with the just-changed function displaying the new value (in this case the raw file resolution 1200 is 6 MP).

The following two examples illustrate the supporting role of the Digital Status display 82 in providing procedural instructions/information for carrying out an action on the camera.

Figure 13:
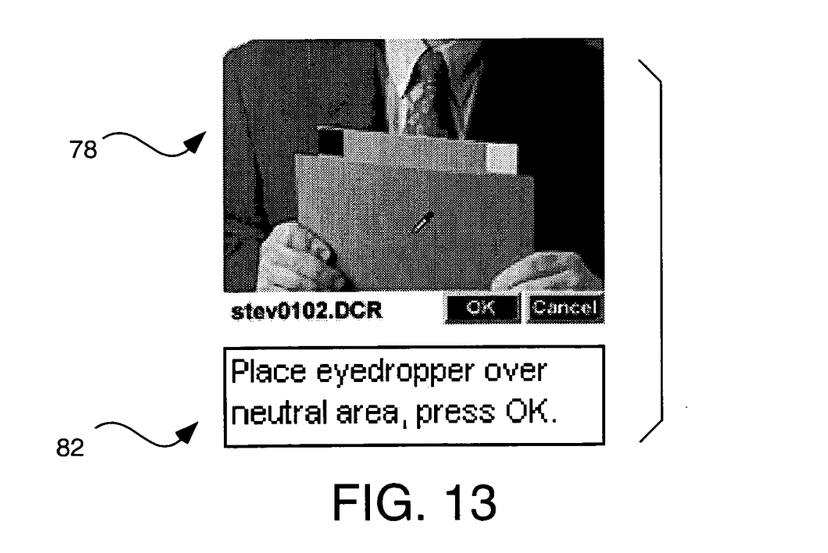

In the first example, displays 78 and 82 (FIG. 13) show the procedural information associated with an on-camera Click Balance function (not further described).

Figure 14:
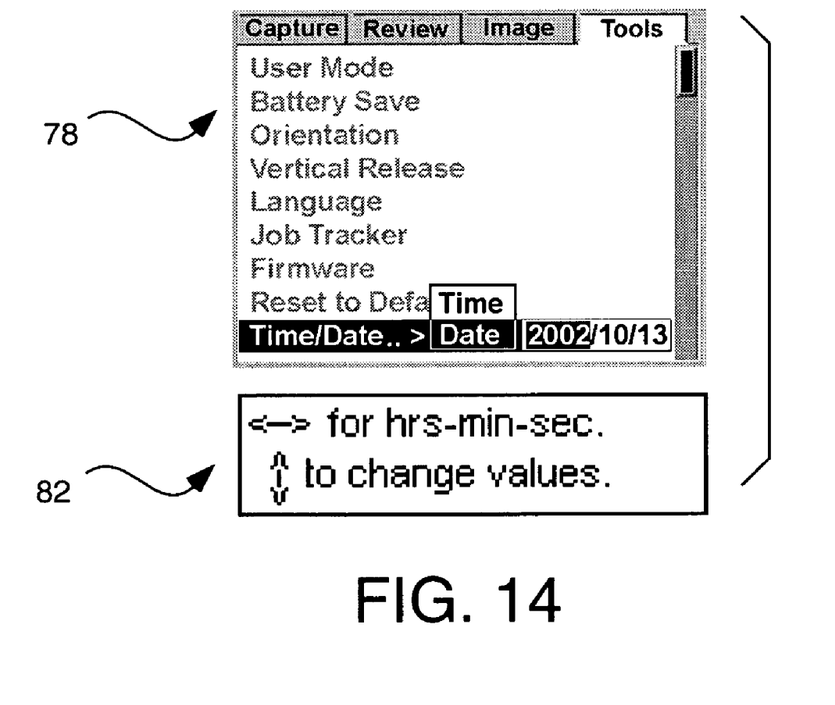

In the next example (FIG. 14), there is shown the mutual display support concept for changing Time/Date values. In this case the Digital Status display 82 portrays instructions on how to manipulate the 4-way switch 102 to change date and time values.

The invention has been described in detail with particular reference to certain preferred embodiments thereof, but it will be understood that variations and modifications can be effected within the spirit and scope of the invention.

| PARTS LIST | |
|---|---|
| 30 | digital camera |
| 32 | lens |
| 33 | adjustable aperture |
| 34 | aperture driver |
| 35 | shutter motor drive |
| 36 | mechanical shutter |
| 37 | driver |
| 40 | image sensor |
| 42 | driver |
| 50 | analog Gain & CDS |
| 52 | A/D converter circuit |
| 62 | controlled interface processor |
| 64 | DRAM buffer memory |
| 66 | digital image processor |
| 68 | RAM |
| 70 | firmware memory |
| 72 | memory card interface |
| 74 | removable memory card |
| 76 | interface |

-continued

PARTS LIST

| | |
|---|---|
| 77 | interface cable |
| 78 | LCD |
| 80 | PC host computer |
| 82 | digital status LCD |
| 84 | menu button |
| 86 | navigate button |
| 88 | hotkey button |
| 90 | digital status button |
| 92 | OK button |
| 94 | cancel button |
| 96 | delete button |
| 100 | tag/record button |
| 102 | 4-way switch |
| 104 | top position of switch |
| 106 | right position of switch |
| 108 | bottom position of switch |
| 110 | left position of switch |
| 200 | housing |
| 202 | back panel |
| 300 | white balance |
| 302 | ISO speed |
| 304 | CF memory card |
| 306 | SD memory card |
| 308 | JPEG quality |
| 310 | raw resolution |
| 312 | JPEG resolution |
| 314 | crop aspect ratio |
| 400 | digital status display function |
| 402 | menu option |
| 500 | image |
| 502 | folder name |
| 504 | ISO and resolution |
| 700 | white balance |
| 702 | highlighted option |
| 800 | white balance |
| 802 | ISO |
| 804 | digital status display function (ISO) |
| 900 | raw resolution icon |
| 902 | ISO icon |
| 904 | highlighted option |
| 1000 | selected function |
| 1002 | cascaded menu |
| 1004 | text message |
| 1100 | resolution option |
| 1102 | highlighted position |
| 1104 | text message |
| 1200 | raw file resolution |

What is claimed is:

1. A digital information/imaging system comprising:
a first display for selectively displaying images and information;
a second display for selectively displaying system information; and
a control for controlling said first and second displays in one or more modes in which the content displayed by each of said displays mutually support each other;
wherein said control includes a user interface including at least a first switch and a second navigation switch;
wherein when said first switch is not activated, said second navigation switch is operable to select items displayed on said first display and said second display displays information in support of items selected on said first display; and
wherein when said first switch is activated, said second navigation switch is operable to select items displayed on said second display and said first display displays information in support of items selected on said second display.

2. The system of claim 1 wherein said system includes a digital camera having a housing with a back panel and wherein said first display, said second display, and said first and second switches of said user interface are mounted on said back panel for convenience of use by a camera user.

3. The system of claim 1 wherein said second navigation switch is a four way switch having a top position, a bottom position, a right side position and a left side position which are selectively actuable.

4. The system of claim 3 wherein said four way switch is one of a rocker switch or a spin dial.

5. The system of claim 1 wherein said first and second displays are liquid crystal displays.

6. The system of claim 5 wherein said second display is a dot matrix liquid crystal display.

7. A digital camera comprising:
a housing having a back panel;
a first display on said back panel;
a second display on said back panel adjacent to said first display;
a first switch on said back panel;
a second navigation switch on said back panel; and
a control for said first and second displays and for said first and second switches, wherein said control is operable in a first mode such that said first display operates in an interactive display role and said second display operates in a supporting display role, and wherein said control is operable in a second mode such that said first display operates in a supporting display role and said second display operates in an interactive display role;
wherein in said interactive display role, manipulation of one or more said first and second switches results in a change in information displayed on said affected display; and
wherein in said supporting display role, said affected display displays information which is dependent upon the outcome of the control-display relationships associated with the display in the interactive display role.

8. The system of claim 1 wherein said first display displays at least one of the following classes of information: images and image related information;
camera menus, related sub-menus, and menu options; and
text-based messages and error messages.

9. The system of claim 1 wherein said second display displays at least one of the following classes of information:
the current status and settings that pertain to various capture-critical digital functions;
the current information properties of images being reviewed on said first display; and
text-based messages to support, guide and help interpret information displayed on said first display.

10. The camera of claim 9 wherein said capture critical functions are interactive in nature and serve to display a set of capture-critical functions and as a shortcut to a relevant menu option for changing the displayed value.

11. The camera of claim 10 wherein said capture critical functions include at least one of white balance, ISO speed, types of memory cards, image file type written to memory cards, compression quality, raw and compression resolution; and
crop aspect ratio.

12. The camera of claim 9 wherein said current information properties of images and said text-based messages are non-interactive in nature.

13. The camera of claim 7 wherein said first switch is a push button.

14. The camera of claim 7 wherein said second switch is a four way switch having top, bottom, right side and left side positions which are selectively actuable.

15. The camera of claim 14 wherein said four way switch is a rocker switch.

16. The camera of claim 7 wherein said first and second displays are liquid crystal displays.

17. The camera of claim 7 wherein said second display is a dot matrix liquid crystal display.

* * * * *